US007568054B2

United States Patent
Morozumi

(10) Patent No.: US 7,568,054 B2
(45) Date of Patent: Jul. 28, 2009

(54) DUPLICATE SYNCHRONIZATION SYSTEM AND METHOD OF OPERATING DUPLICATE SYNCHRONIZATION SYSTEM

(75) Inventor: Yuuichi Morozumi, Tokyo (JP)

(73) Assignee: NEC Corporation, Tokyo (JP)

( * ) Notice: Subject to any disclaimer, the term of this patent is extended or adjusted under 35 U.S.C. 154(b) by 342 days.

(21) Appl. No.: 11/304,897

(22) Filed: Dec. 16, 2005

(65) Prior Publication Data

US 2006/0136613 A1  Jun. 22, 2006

(30) Foreign Application Priority Data

Dec. 21, 2004  (JP)  ............................. 2004-368633

(51) Int. Cl.
  *G06F 13/28* (2006.01)
  *G06F 11/16* (2006.01)
(52) U.S. Cl. .................... 710/22; 710/5; 710/27; 714/2; 714/9; 714/43
(58) Field of Classification Search ............ None
  See application file for complete search history.

(56) References Cited

U.S. PATENT DOCUMENTS 5,185,877 A * 2/1993 Bissett et al. ............ 710/22
5,481,963 A   1/1996 Sesona et al.
5,561,820 A * 10/1996 Bland et al. ............. 710/27
6,496,940 B1  12/2002 Horst et al.

FOREIGN PATENT DOCUMENTS

| EP | 0 411 805 A2   | 2/1991  |
|----|----------------|---------|
| EP | 0411805 A2 *   | 2/1991  |
| EP | 0 439 693 A2   | 8/1991  |
| JP | 9128365        | 5/1997  |
| JP | 10-293697 A    | 11/1998 |
| JP | 200446507      | 2/2004  |

\* cited by examiner

*Primary Examiner*—Ilwoo Park
(74) *Attorney, Agent, or Firm*—Sughrue Mion, PLLC

(57) ABSTRACT

The duplicate synchronization system has: a first system; and a second system operating in synchronization with the first system. The first and the second systems are connected to each other. The first system includes: a first memory; a first memory controller; and a first DMA engine. The second system includes: a second memory; a second memory controller; and a second DMA engine. When sending a read command to the memory controller, each DMA engine can set a source of the read command to either the first DMA engine or the second DMA engine. The memory controller reads out data from the memory in response to the read command, and sends the read data back to the source indicated in the read command.

15 Claims, 16 Drawing Sheets

Fig. 3

| CONFIG-PACKET | TARGET ID | SOURCE ID | CONFIG-WRITE | REGISTER ADDRESS | REGISTER DATA |
|---|---|---|---|---|---|

| READ-PACKET | TARGET ID | SOURCE ID | DMA-MEMORY-COPY-READ | MEMORY ADDRESS | |
|---|---|---|---|---|---|

| COMPLETION-PACKET | TARGET ID | SOURCE ID | COMPLETION | MEMORY ADDRESS | MEMORY DATA |
|---|---|---|---|---|---|

| WRITE-PACKET | TARGET ID | SOURCE ID | DMA-MEMORY-COPY-WRITE | MEMORY ADDRESS | MEMORY DATA |
|---|---|---|---|---|---|

Fig. 5

| | DMA OPERATION MODE | COPY SOURCE ID | COPY DESTINATION ID | CAMOUFLAGE SETTING |
|---|---|---|---|---|
| CONFIG-REGISTER 20a | BOTH SYSTEM MASTER MODE | MAIN MEMORY 4a | MAIN MEMORY 4b | ODD/EVEN |
| CONFIG-REGISTER 20b | BOTH SYSTEM SLAVE MODE | MAIN MEMORY 4a | MAIN MEMORY 4b | — |

Fig. 6

| | TARGET ID | SOURCE ID | COMMAND | MEMORY ADDRESS |
|---|---|---|---|---|
| FIRST READ-PACKET | MEMORY CONTROLLER 6a | DMA ENGINE 10a | DMA-MEMORY-COPY-READ | ODD ADDRESS |
| SECOND READ-PACKET (CAMOUFLAGE) | MEMORY CONTROLLER 6a | DMA ENGINE 10b | DMA-MEMORY-COPY-READ | EVEN ADDRESS |

Fig. 7

| | TARGET ID | SOURCE ID | COMMAND | MEMORY ADDRESS | MEMORY DATA |
|---|---|---|---|---|---|
| FIRST COMPLETION-PACKET | DMA ENGINE 10a | MEMORY CONTROLLER 6a | COMPLETION | ODD ADDRESS | READ DATA |
| SECOND COMPLETION-PACKET | DMA ENGINE 10b | MEMORY CONTROLLER 6a | COMPLETION | EVEN ADDRESS | READ DATA |

Fig. 9

| | DMA OPERATION MODE | COPY SOURCE ID | COPY DESTINATION ID |
|---|---|---|---|
| CONFIG-REGISTER 20b | SINGLE SYSTEM MASTER MODE | MAIN MEMORY 4a | MAIN MEMORY 4b |

Fig. 10

| READ-PACKET | TARGET ID | SOURCE ID | COMMAND | MEMORY ADDRESS |
|---|---|---|---|---|
| | MEMORY CONTROLLER 6a | DMA ENGINE 10b | DMA-MEMORY-COPY-READ | ADDRESS |

Fig. 12

| | DMA OPERATION MODE | COPY SOURCE ID | COPY DESTINATION ID |
|---|---|---|---|
| CONFIG-REGISTER 20a | SINGLE SYSTEM MASTER MODE | MAIN MEMORY 4a | MAIN MEMORY 4b |

Fig. 13

| TARGET ID | SOURCE ID | COMMAND | MEMORY ADDRESS |
|---|---|---|---|
| MEMORY CONTROLLER 6a | DMA ENGINE 10a | DMA-MEMORY-COPY-READ | ADDRESS |

READ-PACKET

Fig. 15

| | DMA OPERATION MODE | COPY SOURCE ID | COPY DESTINATION ID | CAMOUFLAGE SETTING |
|---|---|---|---|---|
| CONFIG-REGISTER 20a | BOTH SYSTEM MASTER MODE | MAIN MEMORY 4a | MAIN MEMORY 4b | CHANGE ALL |
| CONFIG-REGISTER 20b | BOTH SYSTEM SLAVE MODE | MAIN MEMORY 4a | MAIN MEMORY 4b | — |

Fig. 16

| TARGET ID | SOURCE ID | COMMAND | MEMORY ADDRESS |
|---|---|---|---|
| MEMORY CONTROLLER 6a | DMA ENGINE 10b | DMA-MEMORY-COPY-READ | ADDRESS |

READ-PACKET (CAMOUFLAGE)

DUPLICATE SYNCHRONIZATION SYSTEM AND METHOD OF OPERATING DUPLICATE SYNCHRONIZATION SYSTEM

BACKGROUND OF THE INVENTION

1. Field of the Invention

The present invention relates to a duplicate synchronization system. In particular, the present invention relates to a duplicate synchronization system and a method of copying the contents of a memory in the duplicate synchronization system.

2. Description of the Related Art

A fault tolerant (FT) computer is known as a computer providing high reliability. In the FT computer, hardware modules constituting a system are duplicated or multiplexed, and these hardware modules are controlled so as to operate in synchronization with each other. A system such as the FT computer system is referred to as a "duplicate synchronization system" hereinafter. According to the duplicate synchronization system, even when a fault occurs in a certain section (module), it is possible to continue processing in a normal module by separating the fault module. That is to say, the duplicate synchronization system has excellent fault tolerance and availability (for example, refer to Japanese Laid Open Patent Application JP-P-Heisei 10-293697).

The duplicate synchronization system consists of a first system and a second system. In a normal operation, data stored in main memories of both systems are controlled to be always consistent with each other. On the other hand, at the time of system start-up or system restoration after system failure, data stored in the main memories of both systems are not consistent. It is therefore necessary to copy data stored in the main memory of one system to the main memory of the other system as soon as possible and thereby make the both system consistent with each other.

When the one system as a copy source is normally operated during a data restoration process, the data stored in the main memory of the one system is updated. It is therefore necessary to suspend the operation of the whole duplicate synchronization system during the data restoration process. Since the increase in the time for the data restoration disturbs the services, it is preferable that the suspended period is as short as possible. In particular, capacity of the main memory goes on increasing in recent years, and thus a time required for the data copy between the both systems becomes longer and longer. The time required for the data copy is referred to as a "memory copy time" hereinafter. In addition, transfer performance of a data link path connecting between the systems is lower as compared with data transfer performance in an LSI. This is also one of factors which cause the increase in the memory copy time. It is desired to reduce the memory copy time and to shorten the suspended period of the duplicate synchronization system.

SUMMARY OF THE INVENTION

It is therefore an object of the present invention to provide a duplicate synchronization system and a method of operating the same which is capable of reducing the memory copy time.

It is another object of the present invention to provide a duplicate synchronization system and a method of operating the same which is capable of shortening the suspended period of a system operation.

It is still another object of the present invention to provide a duplicate synchronization system and a method of operating the same which is capable of copying data between the both systems even when a DMA engine of one system fails.

It is still another object of the present invention to provide a duplicate synchronization system and a method of operating the same which is capable of copying data between the both systems even when a part of data paths connecting between the both systems fails.

In a first aspect of the present invention, a duplicate synchronization system is provided. The duplicate synchronization system has a first system, and a second system which operates in synchronization with the first system. The first system and the second system are connected to each other through a plurality of data link paths. The first system includes: a first memory; a first controller controlling a read/write for the first memory; and a first DMA engine accessing the first controller. The second system includes: a second memory; a second controller controlling a read/write for the second memory; and a second DMA engine accessing the second controller. When sending a read command in which a source is indicated to any of the first controller and the second controller, each of the first DMA engine and the second DMA engine sets the source to any of the first DMA engine and the second DMA engine. The first controller is configured to read out a data from the first memory in response to the read command, and send the read data back to the source. The second controller is configured to read out a data from the second memory in response to the read command, and send the read data back to the source.

In a data copy from the first memory to the second memory, the first DMA engine sends to the first controller not only a first read command in which the source is set to the first DMA engine but also a second read command in which the source is set to the second DMA engine. The first controller reads out data from the first memory in response to respective of the first read command and the second read command, and sends the read data to respective of the first DMA engine and the second DMA engine. The first DMA engine and the second DMA engine write the read data to the second memory through the second controller. As described above, since both the first DMA engine and the second DMA engine are used in the data copy operation, the copy speed of the memory data is improved as a whole, and thus a total time required for the memory copy is reduced. Thus, the suspended period of the system operation can be shortened.

The first controller reads out data stored in a first address group in the first memory in response to the first read command, and reads out data stored in a second address group different from the first address group in the first memory in response to the second read command. The first address group may be one of an odd address group and an even address group, and the second address group may be the other of the odd address group and the even address group.

In a data copy from the first memory to the second memory and in a case when the first DMA engine fails, the second DMA engine sends to the first controller the read command in which the source is set to the second DMA engine. The first controller reads out data from the first memory in response to the read command, and sends the read data back to the second DMA engine. The second DMA engine writes the read data to the second memory through the second controller. As described above, it is possible to copy the data between the both systems even when the first DMA engine fails.

In a data copy from the first memory to the second memory and in a case when the second DMA engine fails, the first DMA engine sends to the first controller the read command in which the source is set to the first DMA engine. The first controller reads out data from the first memory in response to the read command, and sends the read data back to the first DMA engine. The first DMA engine writes the read data to the second memory through the second controller. As described above, it is possible to copy the data between the both systems even when the second DMA engine fails.

Moreover, in a data copy from the first memory to the second memory, the first DMA engine can send to the first controller the read command in which the source is set to the second DMA engine. The first controller reads out data from the first memory in response to the read command, and sends the read data to the second DMA engine. The second DMA engine writes the read data to the second memory through the second controller.

Even when at least any of the plurality of data link paths is failed, it is possible to copy the data between the both systems by applying any of the foregoing operations.

In a second aspect of the present invention, a DMA engine is provided. The DMA engine is in a duplicate synchronization system which has a first system and a second system operating in synchronization with the first system. The DMA engine can issues a command by designating any of a first ID indicative of a DMA engine in the first system and a second ID indicative of a DMA engine in the second system as an ID of a source of the command.

In a third aspect of the present invention, a method of operating the duplicate synchronization system is provided. According to the method, at least one of the first DMA engine and the second DMA engine is used in a data copy from the first memory and the second memory. Both of the first DMA engine and the second DMA engine may be used. In this case, one of the first DMA engine and the second DMA engine is used for reading out data stored in an odd address group in the first memory, and the other of the first DMA engine and the second DMA engine is used for reading out data stored in an even address group in the first memory. Alternatively, one of the first DMA engine and the second DMA engine which does not fail is used as the at least one DMA engine.

According to the duplicate synchronization system and the method of operating the same of the present invention, the memory copy time is reduced.

According to the duplicate synchronization system and the method of operating the same of the present invention, the suspended period of the system operation is shortened.

According to the duplicate synchronization system and the method of operating the same of the present invention, it is possible to copy data between the both systems even when the DMA engine of one system fails.

According to the duplicate synchronization system and the method of operating the same of the present invention, it is possible to copy data between the both systems even when a part of the data paths connecting between the both systems fails.

BRIEF DESCRIPTION OF THE DRAWINGS

FIG. 3 is a diagram showing contents of packets according to the present invention;

FIG. 5 is a diagram showing contents of a config-register in the first embodiment of the present invention;

FIG. 6 is a diagram showing contents of a read-packet in the first embodiment of the present invention;

FIG. 7 is a diagram showing contents of a completion-packet in the first embodiment of the present invention;

FIG. 9 is a diagram showing contents of a config-register in the second embodiment of the present invention;

FIG. 10 is a diagram showing contents of a read-packet in the second embodiment of the present invention;

FIG. 12 is a diagram showing contents of a config-register in the third embodiment of the present invention;

FIG. 13 is a diagram showing contents of a read-packet in the third embodiment of the present invention;

FIG. 15 is a diagram showing contents of a config-register in the fourth embodiment of the present invention; and FIG. 16 is a diagram showing contents of a read-packet in the fourth embodiment of the present invention.

DESCRIPTION OF THE PREFERRED EMBODIMENTS

A duplicate synchronization system and a method of copying in the duplicate synchronization system according to the present invention will be described below with reference to the accompanying drawings.

Figure 1:
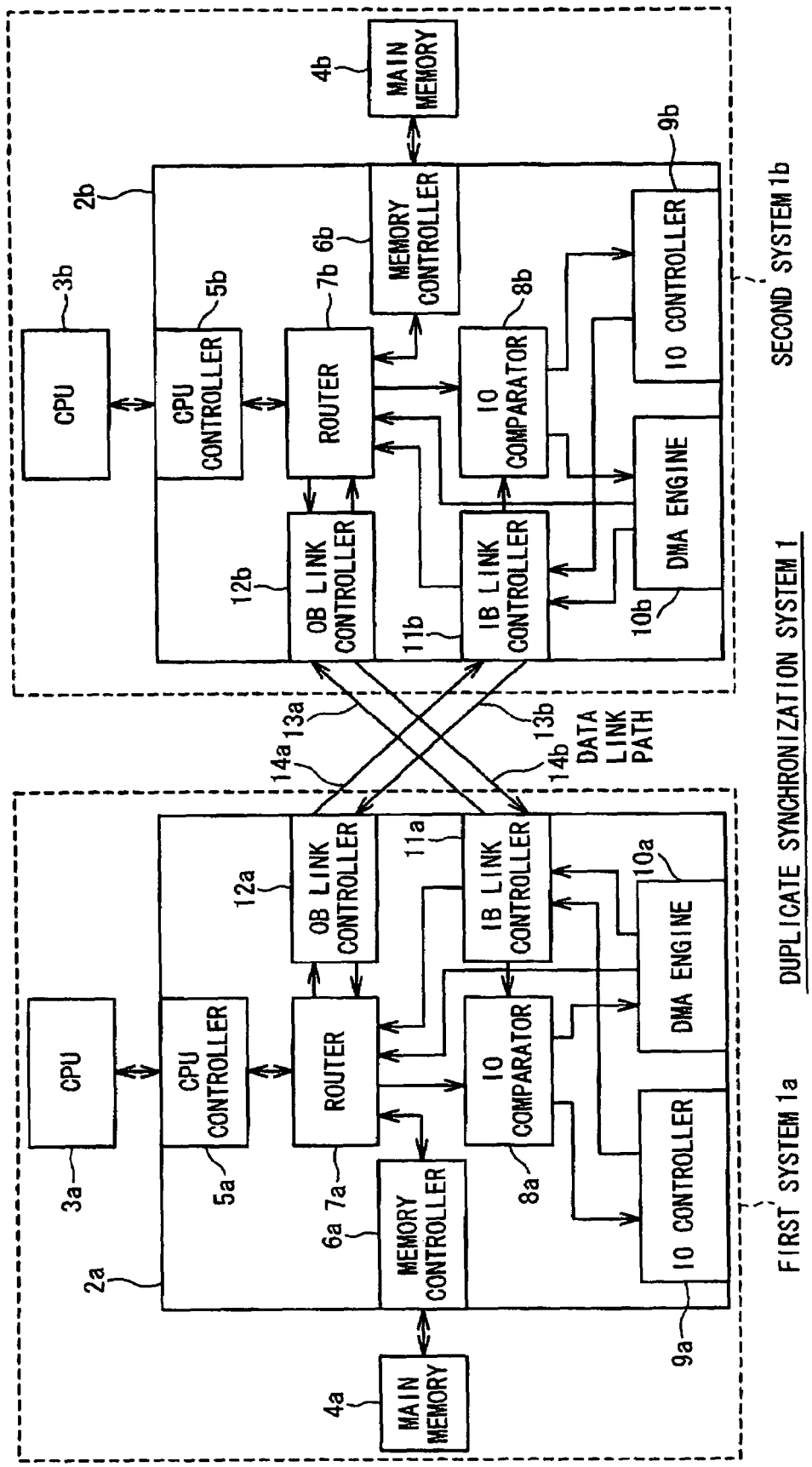
FIG. 1 is a block diagram showing a configuration of a duplicate synchronization system according to the present invention.

FIG. 1 is a block diagram showing a configuration of a duplicate synchronization system 1 according to the present invention. The duplicate synchronization system 1 includes a first system 1a and a second system 1b. The first system 1a and the second system 1b operate in synchronization with each other.

The first system 1a is provided with a control LSI 2a, a CPU 3a and a main memory 4a. The control LSI 2a is connected to the CPU 3a and the main memory 4a. The control LSI 2a includes a CPU controller 5a, a memory controller 6a, a router 7a, an IO comparator 8a, an IO controller 9a, a DMA engine 10a, an IB (In-Bound) link controller 11a and an OB (Out-Bound) link controller 12a.

The second system 1b has the same configuration as that of the first system 1a. That is, the second system 1b is provided with a control LSI 2b, a CPU 3b and a main memory 4b. The control LSI 2b is connected to the CPU 3b and the main memory 4b. The control LSI 2b includes a CPU controller 5b, a memory controller 6b, a router 7b, an IO comparator 8b, an IO controller 9b, a DMA engine 10b, an IB link controller 11b and an OB link controller 12b.

The CPU controller 5 controls a connecting bus to the CPU 3. The memory controller 6 controls an access (read/write) to the memory 4. The router 7 has a function of controlling routing, and routes each request to any of a CPU system, a memory system and an IO system. The 10 controller 9 controls a connecting bus to IO devices.

The first system 1a and the second system 1b are connected with each other via a plurality of data link paths 13a, 13b, 14a and 14b. Each data link path 13 is used for In-Bound data transfer from the IO side to the CPU/memory side, while each data link path 14 is used for Out-Bound data transfer from the CPU/memory side to the IO side. The IB link controller 11 controls the In-Bound data transfer (hereinafter, referred to as an IB data transfer). On the other hand, the OB link controller 12 controls the Out-Bound data transfer (hereinafter, referred to as an OB data transfer).

An IB data transfer from the first system 1a to the second system 1b is executed through the IB link controller 11a, the data link path 13a and the OB link controller 12b. An OB data transfer from the first system 1a to the second system 1b is executed through the OB link controller 12a, the data link path 14a and the IB link controller 11b. An IB data transfer from the second system 1b to the first system 1a is executed through the IB link controller 11b, the data link path 13b and the OB link controller 12a. An OB data transfer from the second system 1b to the first system 1a is executed through the OB link controller 12b, the data link path 14b and the IB link controller 11a. The IO comparator 8 compares the Out-Bound access of own system with the Out-Bound access from the other system in an operation.

The DMA engine (DMA controller) 10 controls a DMA transfer. In the DMA (Direct Memory Access) transfer, data are directly transferred between an I/O device and the memory 4 without involving the CPU 3. The DMA engine 10a of the first system 1a is capable of accessing the memory controller 6a via the router 7a. The DMA engine 10a is also capable of accessing the memory controller 6b of the second system 1b via the IB link controller 11a. The DMA engine 10b of the second system 1b is capable of accessing the memory controller 6b via the router 7b. The DMA engine 10b is also capable of accessing the memory controller 6a of the first system 1a via the IB link controller 11b.

Figure 2:
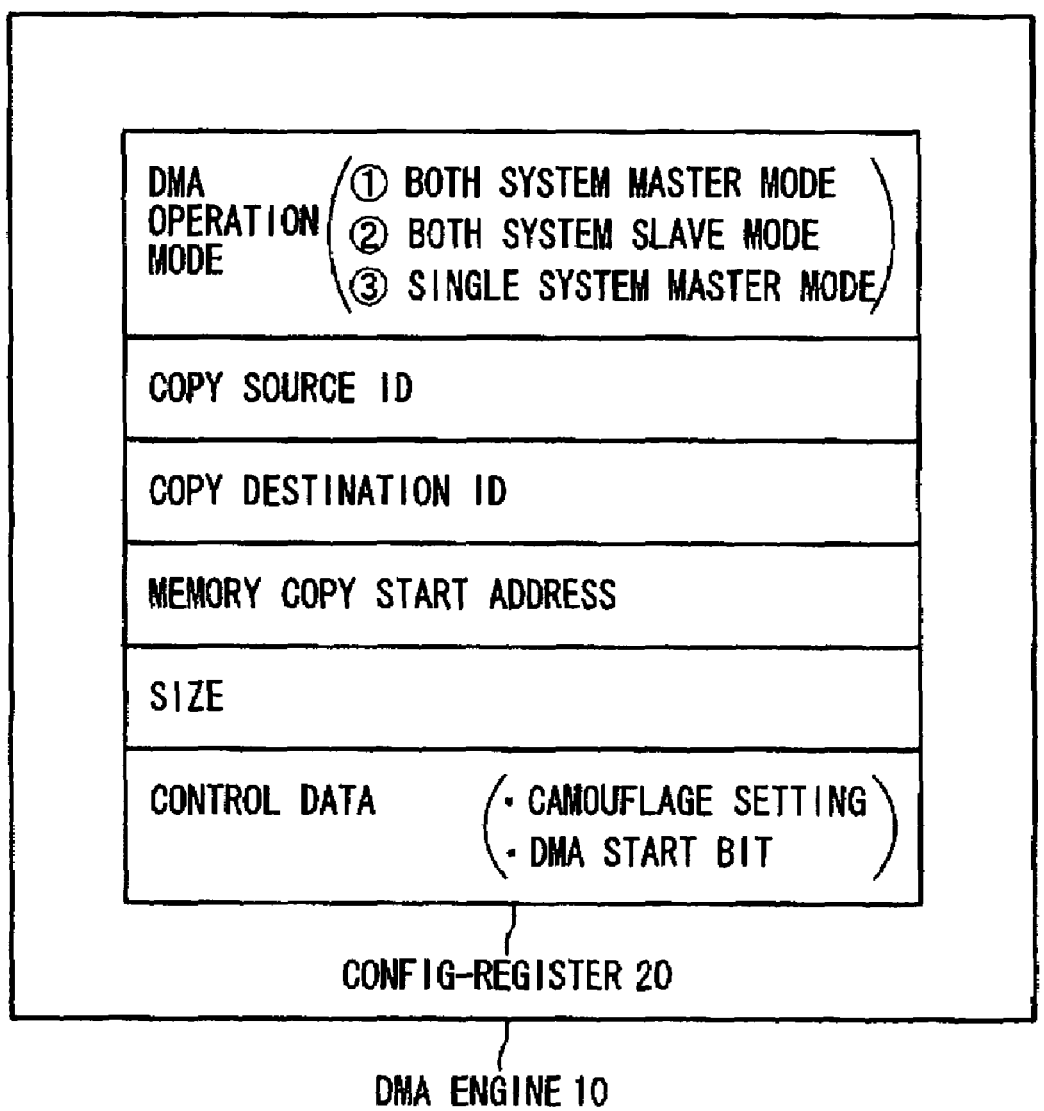
FIG. 2 is a conceptual view showing a configuration of a DMA engine according to the present invention.

FIG. 2 shows a configuration of the DMA engine 10 according to the present invention in more detail. The DMA engine 10 according to the present invention has a config-register 20. Set (registered) in the config-register 20 are a "DMA operation mode", a "copy source ID", a "copy destination ID", a "memory copy start address", a "size" and a "control data (information)". As the "DMA operation mode", the following three kinds can be set: 1. both system master mode; 2. both system slave mode; and 3. single system master mode. An operation in each mode will be described later in detail. Set in the "copy source ID" is an ID of a main memory 4 as a copy source, while set in the "copy destination ID" is an ID of a main memory 4 as a copy destination. A head address at which a copy is started is set in the "memory copy start address". A size of a memory region to be copied is set in the "size". The DMA engine 10 issues as many read commands as the size while updating a target address. Set in the "control data" are a "camouflage setting", a DMA start bit and the like. The camouflage setting will be described later in detail. When the DMA start bit is set to ON, a DMA operation is started.

The above-mentioned settings for the config-register 20 are performed by the CPU 3. That is, the DMA engine 10a of the first system 1a has a config-register 20a, and the settings for the config-register 20a are performed by the CPU 3a or the CPU 3b. Also, the DMA engine 10b of the second system 1b has a config-register 20b, and the settings for config-register 20b are performed by the CPU 3b or the CPU 3a.

In the above-described duplicate synchronization system 1, a request (command) from a component to another component is executed through transferring packets. In the following description, a command issuing side, namely, a packet transmitting side is referred to as a "Source". On the other hand, a packet receiving side is referred to as a "Target".

FIG. 3 shows contents of the packets used in the duplicate synchronization system 1 according to the present invention. A config-packet is generated by the CPU 3 in order to make settings in the config-register 20. The config-packet includes a "target ID" as an ID indicating a target, a "source ID" as an ID indicating a source, a "Config-Write command" issued by the CPU 3, a "register address" and "register data" set in the config-register 20. A read-packet is generated by the DMA engine 10 in order to read out data from the main memory 4. The read-packet includes a "target ID", a "source ID", a "DMA-Memory-Copy-Read command" issued by the DMA engine 10 and a "memory address". A completion-packet is issued by the memory controller 6. The completion-packet includes a "target ID", a "source ID", a "Completion command" issued by the memory controller 6, a "memory address" and "memory data" read out from the main memory 4. A write-packet is generated by the DMA engine 10 in order to write the data in the main memory 4. The write-packet includes a "target ID", a "source ID", a "DMA-Memory-Copy-Write command" issued by the DMA engine 10, a "memory address" and the "memory data".

The CPU 3 can transmit config-packets to respective of the DMA engine 10a (first DMA engine) of the first system 1a and the DMA engine 10b (second DMA engine) of the second system 1b. The settings of the corresponding config-register 20 are executed by the Config-Write command.

In a DMA operation, the DMA engine 10 can send a read-packet (read command) to the memory controller 6a of the first system 1a and the memory controller 6b of the second system 1b. In the read-packet, the target ID is set to a memory controller 6 corresponding to the copy source ID indicated in the config-register 20.

The memory controller 6 receives the read-packet from the DMA engine 10. In response to the DMA-Memory-Copy-Read command (read command), the memory controller 6 reads out data from the corresponding main memory 4. After reading out the data, the memory controller 6 sends a completion-packet back to the router 7. Here, the memory controller 6 interchanges the target ID and the source ID indicated in the read-packet, and sets them as the target ID and the source ID of the completion-packet. In other wods, the source ID of the completion-packet is set to the target ID of the read-packet, and the target ID of the completion-packet is set to the source ID of the read-packet.

When receiving the completion-packet, the router 7 checks the target ID. Then, in accordance with the target ID, the router 7 forwards the completion-packet to the DMA engine 10 of own system or to the DMA engine 10 of another system via the OB link controller 12.

When receiving the completion-packet, the DMA engine 10 outputs a write-packet (write command). In the write-packet, the target ID is set to a memory controller 6 corresponding to the copy destination ID indicated in the config-register 20. The memory controller 6 receives the write-packet. In response to the DMA-Memory-Copy-Write command (write command), the memory controller 6 writes the memory data to the corresponding main memory 4.

As described above, the data copy from the main memory 4 of one system to the main memory 4 of the other system is carried out in the DMA operation. According to the present invention, the DMA engine 10 is capable of setting the source of the read-packet to either the first DMA engine 10a or the second DMA engine 10b. For example, the first DMA engine 10a of the first system 1a can send not only a read-packet in which the source is set to the first DMA engine 10a but also a read-packet in which the source is set to the second DMA engine 10b. In this case, the read-packet in which the source is set to the second DMA engine 10b is a "camouflage-packet". The memory controller 6 receiving the camouflage-packet interprets that the camouflage-packet as the read-packet is transmitted from the second DMA engine 10b. Therefore, a completion-packet responding to the camouflage-packet is transmitted not to the first DMA engine 10a but to the second DMA engine 10b. What camouflages are performed is set as the "camouflage setting" in the config-register 20 (see FIG. 2).

Hereinafter, operations and effects of the duplicate synchronization system 1 and the DMA engine 10 according to the present invention will be explained in detail with using some examples. In the following examples, a situation will be represented in which data are copied from the main memory 4a of the first system 1a (copy source) to the main memory 4b of the second system 1b (copy destination) after the CPU 3b of the second system 1b is recovered from a failure.

First Embodiment

Figure 4:
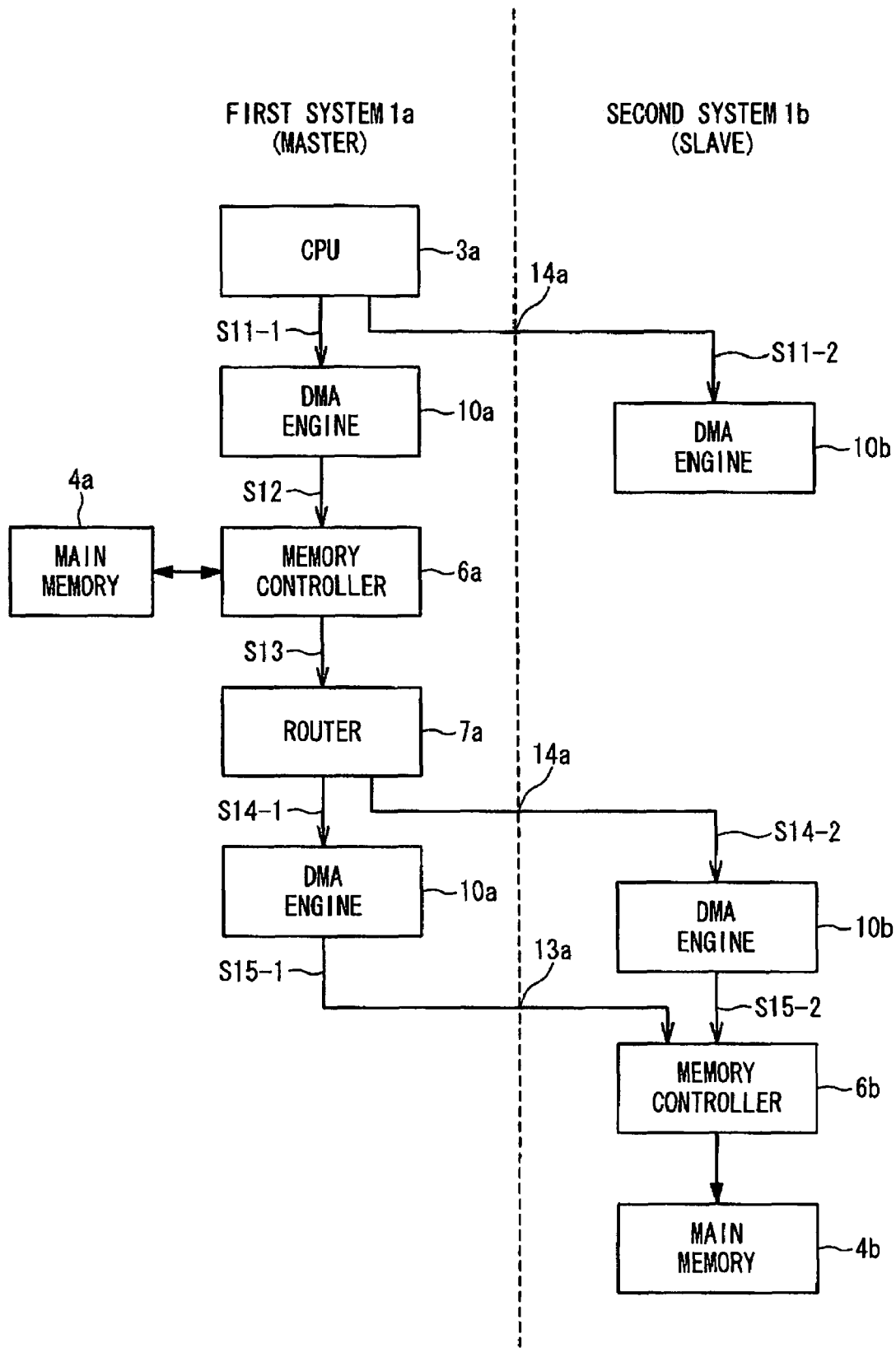
FIG. 4 shows a flow of processing in a first embodiment of the present invention.

In a frist embodiment, both the first DMA engine 10a and the second DMA engine 10b are used (both system mode). FIG. 4 shows a flow of a processing according to the present embodiment.

First, the CPU 3a of the first system 1a confirms that the first DMA engine 10a and the second DMA engine 10b are available and no errors occur on the data link paths 13 and 14. Then, the CPU 3a transmits a config-packet to the first DMA engine 10a (Step S11-1). Also, the CPU 3a transmits a config-packet to the second DMA engine 10b via the data link path 14a (Out-Bound) (Step S11-2). Thereby, the settings of the config-register 20a and the config-register 20b are carried out.

FIG. 5 shows contents of the config-registers 20a and 20b which are set. In the config-register 20a, the DMA operation mode is set to the "both system master mode". On the other hand, in the config-register 20b, the DMA operation mode is set to the "both system slave mode". That is to say, in the present embodiment, the first system 1a functions as a master, while the second system 1b functions as a slave. In the config-register 20a, the camouflage setting is set to "odd/even". According to the setting, as described later, the camouflage is enabled in accordance with whether a read address corresponds to an odd number or an even number. In the both config-registers 20a and 20b, the copy source is set to the main memory 4a and the copy destination is set to the main memory 4b. When the DMA start bit is turned ON, the DMA operation is started.

Since the DMA operation mode is set to the "both system slave mode", the second DMA engine 10b does not generate a read-packet. On the other hand, since the DMA operation mode is set to the "both system master mode", the first DMA engine 10a generates a read-packet based on the camouflage setting and outputs the generated read-packet.

FIG. 6 shows contents of the read-packets generated by the first DMA engine 10a. In the present embodiment, the first DMA engine 10a generates two kinds of read-packets. For example, the source of a first read-packet is set to the first DMA engine 10a, while the source of a second read-packet is set to the second DMA engine 10b. In other words, the second read-packet is a "camouflage-packet". In both packets, the target is set to the memory controller 6a in accordance with the copy source ID (main memory 4a) indicated in the config-register 20a. Also, the first read-packet is related to an odd address group in the main memory 4a, and the second read-packet is related to an even address group in the main memory 4a. In this case, the first read-packet is used for reading out data stored in the odd address group. On the other hand, the second read-packet is used for reading out data stored in the even address group. It should be noted that the first read-packet can be related to the even address group, and the second read-packet can be related to the odd address group.

With reference to FIG. 4, the first DMA engine 10a sends the generated first read-packet and second read-packet to the memory controller 6a through the router 7a (Step S12). When the memory controller 6a receives the first read-packet, the memory controller 6a reads out a read data from an odd address of the main memory 4a in response to the DMA-Memory-Copy-Read command. Then, the memory controller 6a sends a first completion-packet including the read data to the router 7a (Step S13). Also, when the memory controller 6a receives the second read-packet, the memory controller 6a reads out a read data from an even address of the main memory 4a in response to the DMA-Memory-Copy-Read command. Then, the memory controller 6a sends a second completion-packet including the read data back to the router 7a (Step S13).

FIG. 7 shows contents of the first completion-packet and the second completion-packet output from the memory controller 6a. The memory controller 6a interchanges the target ID and the source ID indicated in the read-packet, and sets them as the target ID and the source ID of the completion-packet. That is, in the first completion-packet, the target is set to the first DMA engine 10a and the source is set to the memory controller 6a. In the second completion-packet, the target is set to the second DMA engine 10b and the source is set to the memory controller 6a.

Referring back to FIG. 4, when receiving the completion-packet, the router 7a checks its target ID. When the router 7a receives the first completion-packet, namely, when the target is the first DMA engine 10a, the router 7a forwards the first completion-packet back to the first DMA engine 10a via the IO comparator 8a (Step S14-1). On the other hand, when the router 7b receives the second completion-packet, namely, when the target is the second DMA engine 10b, the router 7a forwards the second completion-packet to the OB link controller 12a. As a result, the second completion-packet is transmitted to the second DMA engine 10b through the data link path 14a, the IB link controller 11b and the IO comparator 8b (Step S14-2).

When receiving the first completion-packet, the first DMA engine 10a generates a write-packet. In the write-packet, the target is set to the memory controller 6b in accordance with the copy destination ID (main memory 4b) indicated in the config-register 20a. Therefore, the write-packet output from the first DMA engine 10a is transmitted to the memory controller 6b through the IB link controller 11a, the data link path 13a, the OB link controller 12b and the router 7b (Step S15-1). When receiving the write-packet, the memory controller 6b writes the read data to the odd address of the main memory 4b in response to the DMA-Memory-Copy-Write command.

The DMA engine 10 whose operation mode is set to the "both system slave mode" generates only the write-packet. That is, when receiving the second completion-packet, the second DMA engine 10b generates a write-packet. In the write-packet, the target is set to the memory controller 6b in accordance with the copy destination ID (main memory 4b) indicated in the config-register 20b. Therefore, the write-packet output from the second DMA engine 10b is transmitted to the memory controller 6b through the router 7b (Step S15-2). When receiving the write-packet, the memory controller 6b writes the read data to the even address of the main memory 4b in response to the DMA-Memory-Copy-Write command.

By the DMA operation described above, the memory data are copied from the main memory 4a to the main memory 4b. In the foregoing example, the camouflage packet is generated in accordance with whether the target address indicates odd number or the even number. However, the camouflage setting is not limited thereto. For example, the memory space of the main memory 4 is divided into two sections, and two start addresses are provided. The first read-packet is related to a first address group, and the second read-packet is related to a second address group different from the first address group.

According to the present embodiment as described above, since the first DMA engine 10a generates the camouflage-packet, it is possible to carry out the data copy by simultaneously using both the first DMA engine 10a and the second DMA engine 10b. In the above example, the second DMA engine 10b plays a role of generating the write-packet corresponding to the second completion-packet. As a result, load on the first DMA engine 10a is reduced. Therefore, the copy speed of the memory data is improved as a whole, and thus a total time required for the memory copy is reduced. That is, the suspended period of the system operation can be shortened.

Moreover, the write-packet generated by the first DMA engine 10a is transmitted to the memory controller 6b via the data link path 13a, and the second completion-packet is transmitted to the second DMA engine 10b via the data link path 14a. In other words, it is possible to carry out the transmission between the systems, namely, the data copy by simultaneously using both the data link paths 13a and 14a. As a result, the copy speed of the memory data is improved as a whole, and thus a total time required for the memory copy is reduced. Therefore, the suspended period of the system operation can be shortened.

Furthermore, since the first DMA engine 10a generates the camouflage-packet, the second DMA engine 10b needs not to issue any read-packet (read command). In other words, it is not necessary to transmit a read command from the second DMA engine 10b to the memory controller 6a via the IB link controller 11b, the data link path 13b, the OB link controller 12a and the router 7a. A transmission of a read command between the systems is omitted. As a result, the copy speed of the memory data is improved as a whole, and thus a total time required for the memory copy is reduced. Therefore, the suspended period of the system operation can be shortened.

Second Embodiment

Figure 8:
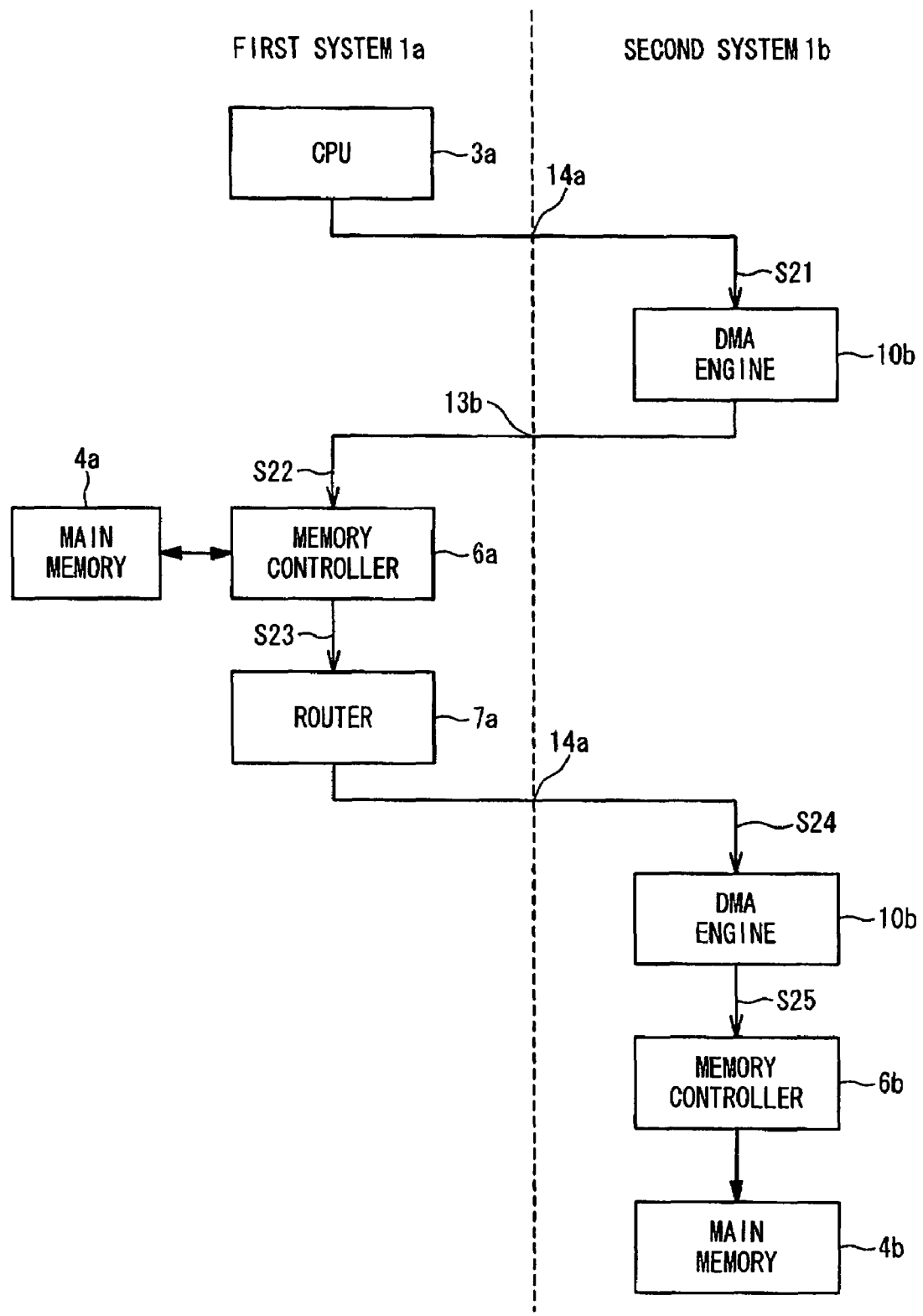
FIG. 8 shows a flow of a processing in a second embodiment of the present invention.

Described in a second embodiment is a case when the first DMA engine 10a of the first system 1a fails. In this case, only the second DMA engine 10b which does not fail is used (single system mode). FIG. 8 shows a flow of a processing according to the present embodiment.

First, the CPU 3a of the first system 1a detects the failure of the first DMA engine 10a, and confirms that the second DMA engine 10b is available and no errors occur on the data link paths 13 and 14. After that, the CPU 3a sends a config-packet to the second DMA engine 10b via the data link path 14a (Out-Bound) (Step S21). Thereby, the settings of the config-register 20b are executed.

FIG. 9 shows contents of the config-register 20b which is set. In the config-register 20b, the DMA operation mode is set to the "single system master mode". Moreover, in the config-register 20b, the copy source is set to the main memory 4a, while the copy destination is set to the main memory 4b. When the DMA operation mode is set to the "single system master mode", the camouflage setting is not available. When the DMA start bit is turned ON, the DMA operation is started.

The second DMA engine 10b generates a read-packet. FIG. 10 shows contents of the read-packet generated by the second DMA engine 10b. The source of the read-packet is set to the second DMA engine 10b. The target of the read-packet is set to the memory controller 6a in accordance with the copy source ID (main memory 4a) indicated in the config-register 20b. Therefore, the read-packet output from the second DMA engine 10b is transmitted to the memory controller 6a via the IB link controller 11b, the data link path 13b, the OB link controller 12a and the router 7a (Step S22 in FIG. 8).

Referring back to FIG. 8, the memory controller 6a receives the read-packet. When receiving the read-packet, the memory controller 6a reads out read data from the main memory 4a in response to the DMA-Memory-Copy-Read command. Then, the memory controller 6a sends a completion-packet including the read data to the router 7a (Step S23). Here, the memory controller 6a interchanges the target ID and the source ID indicated in the read-packet, and sets them as the target ID and the source ID of the completion-packet. That is to say, in the completion-packet, the target is set to the second DMA engine 10b, and the source is set to the memory controller 6a.

When receiving the completion-packet, the router 7a checks the target ID. Since the target here is the second DMA engine 10b, the router 7a forwards the completion-packet to the OB link controller 12a. Thereby, the completion-packet is transmitted to the second DMA engine 10b through the data link path 14a, the IB link controller 11b and the IO comparator 8b (Step S24).

When receiving the completion-packet, the second DMA engine 10b generates a write-packet. In the write-packet, the target is set to the memory controller 6b in accordance with the copy destination ID (main memory 4b) indicated in the config-register 20b. Therefore, the write-packet output from the second DMA engine 10b is transmitted to the memory controller 6b through the router 7b (Step S25). When receiving the write-packet, the memory controller 6b writes the read data to the main memory 4b in response to the DMA-Memory-Copy-Write command.

According to the present embodiment, as described above, it is possible to copy the memory data from the first main memory 4a to the second main memory 4b even when the first DMA engine 10a is being failed.

Third Embodiment

Figure 11:
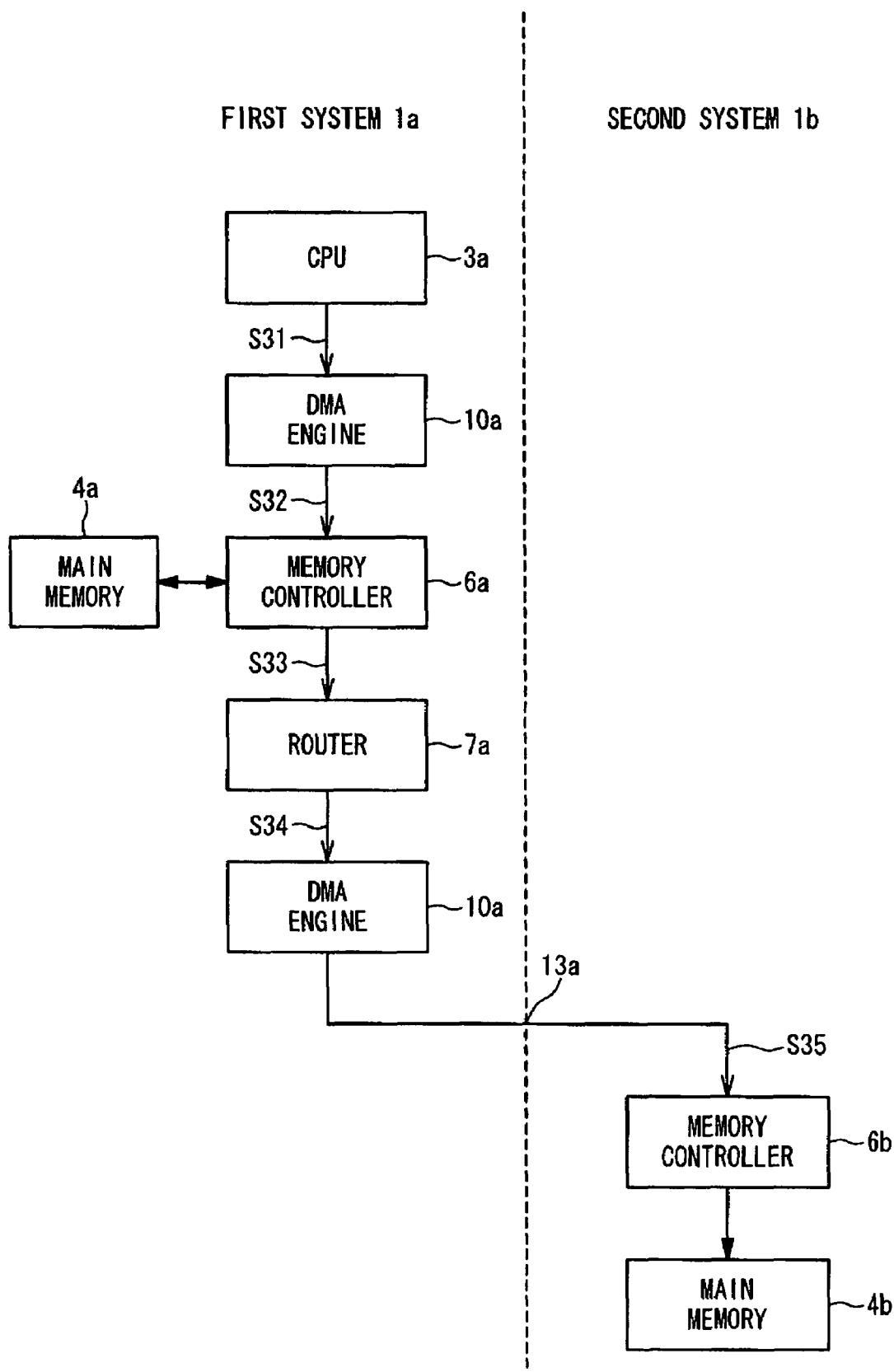
FIG. 11 shows a flow of a processing in a third embodiment of the present invention.

Described in a third embodiment is a case when the second DMA engine 10b of the second system 1b fails. In this case, only the first DMA engine 10a which does not fail is used (single system mode). FIG. 11 shows a flow of a processing according to the present embodiment.

First, the CPU 3a of the first system 1a detects the failure of the second DMA engine 10b, and confirms that the first DMA engine 10a is available and no errors occur on the data link paths 13 and 14. After that, the CPU 3a sends a config-packet to the first DMA engine 10a (Step S31). Thereby, the settings of the config-register 20a are executed.

FIG. 12 shows contents of the config-register 20a which is set. In the config-register 20a, the DMA operation mode is set to the "single system master mode". Further in the config-register 20a, the copy source is set to the main memory 4a, and the copy destination is set to the main memory 4b. When the DMA operation mode is set to the "single system master mode", the camouflage setting is not available. When the DMA start bit is turned ON, the DMA operation is started.

The first DMA engine 10a generates a read-packet. FIG. 13 shows contents of the read-packet generated by the first DMA engine 10a. The source of the read-packet is set to the first DMA engine 10a. The target of the read-packet is set to the memory controller 6a in accordance with the copy source ID (main memory 4a) indicated in the config-register 20a. Therefore, the read-packet output from the first DMA engine 10a is transmitted to the memory controller 6a through the router 7a (Step S32 in FIG. 11).

Referring back to FIG. 11, the memory controller 6a receives the read-packet. When receiving the read-packet, the memory controller 6a reads out read data from the main memory 4a in response to the DMA-Memory-Copy-Read command. Then, the memory controller 6a transmits a completion-packet including the read data to the router 7a (Step S33). Here, the memory controller 6a interchanges the target ID and the source ID indicated in the read-packet, and sets them as the target ID and the source ID of the completion-packet. That is to say, in the completion-packet, the target is set to the first DMA engine 10a, and the source is set to the memory controller 6a.

When receiving the completion-packet, the router 7a checks its target ID. Since the target here is the first DMA engine 10a, the router 7a forwards the completion-packet to the first DMA engine 10a via the IO comparator 8a (Step S34).

When receiving the completion-packet, the first DMA engine 10a generates a write-packet. In the write-packet, the target is set to the memory controller 6b in accordance with the copy destination ID (main memory 4b) indicated in the config-register 20a. Therefore, the write-packet output from the first DMA engine 10a is transmitted to the memory controller 6b through the IB link controller 11a, the data link path 13a, the OB link controller 12b and the router 7b (Step S35). When receiving the write-packet, the memory controller 6b writes the read data to the main memory 4b in response to the DMA-Memory-Copy-Write command.

According to the present embodiment, as described above, it is possible to copy the memory data from the first main memory 4a to the second main memory 4b even when the second DMA engine 10b fails. Furthermore, the data link path which is used in the present embodiment is only the data link path 13a as shown in FIG. 11. Therefore, the present embodiment has an excellent tolerance to failures of the data link paths.

Fourth Embodiment

Figure 14:
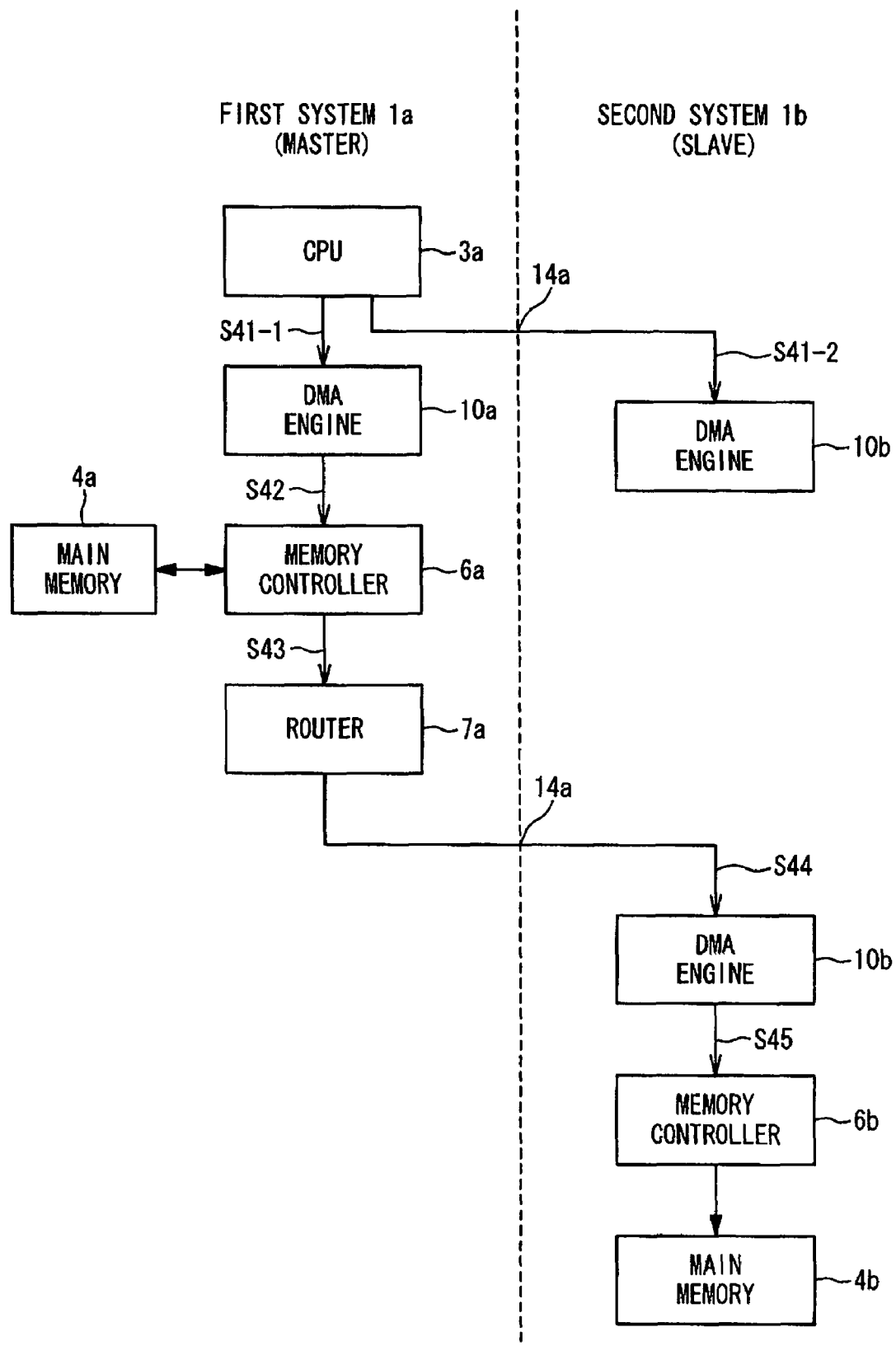
FIG. 14 shows a flow of a processing in a fourth embodiment of the present invention.

A fourth embodiment is a kind of the both system mode different from the first embodiment. That is, both the first DMA engine 10a and the second DMA engine 10b are used. FIG. 14 shows a flow of a processing according to the present embodiment.

First, the CPU 3a of the first system 1a confirms that the first DMA engine 10a and the second DMA engine 10b are available. After that, the CPU 3a transmits a config-packet to the first DMA engine 10a (Step S41-1). Also, the CPU 3a transmits a config-packet to the second DMA engine 10b via the data link path 14a (Out-Bound) (Step S41-2). Thereby, the settings of the config-register 20a and the config-register 20b are executed.

FIG. 15 shows contents of the config-registers 20a and 20b which are set. The DMA operation mode is set to the "both system master mode" in the config-register 20a. On the other hand, the DMA operation mode is set to the "both system slave mode" in the config-register 20b. That is to say, in the present embodiment, the first system 1a functions as a master, and the second system 1b functions as a slave. Moreover, in the config-register 20a, the camouflage setting is set to "change all". According to the setting, as described later, all read-packets are camouflaged. Further in both the config-registers 20a and 20b, the copy source is set to the main memory 4a, and the copy destination is set to the main memory 4b. When the DMA start bit is turned ON, the DMA operation is started.

Since the DMA operation mode is set to the "both system slave mode", the second DMA engine 10b does not output any read-packet. On the other hand, since the DMA operation mode is set to the "both system master mode", the first DMA engine 10a generates a read-packet based on the above-mentioned camouflage setting, and outputs the generated read-packet.

FIG. 16 shows contents of the read-packet generated by the first DMA engine 10a. In the present embodiment, all read-packets are "camouflage-packets". In other words, the sources of the all read-packets are set to the second DMA engine 10b. The targets of the all read-packets are set to the memory controller 6a in accordance with the copy source ID (main memory 4a) indicated in the config-register 20a. Therefore, the read-packet output from the first DMA engine 10a is transmitted to the memory controller 6a through the router 7a (Step S42 in FIG. 14).

Referring back to FIG. 14, the memory controller 6a receives the read-packet. When receiving the read-packet, the memory controller 6a reads out read data from the main memory 4a in response to the DMA-Memory-Copy-Read command. Then, the memory controller 6a sends a completion-packet including the read data to the router 7a (Step S43). Here, the memory controller 6a interchanges the target ID and the source ID indicated in the read-packet, and sets them as the target ID and the source ID of the completion-packet. That is to say, in the completion-packet, the target is set to the second DMA engine 10b, and the source is set to the memory controller 6a.

When receiving the completion-packet, the router 7a checks its target ID. Since the target here is the second DMA engine 10b, the router 7a forwards the completion-packet to the OB link controller 12a. Thereby, the completion-packet is transmitted to the second DMA engine 10b via the data link path 14a, the IB link controller 11b and the IO comparator 8b (Step S44).

When receiving the completion-packet, the second DMA engine 10b generates a write-packet. In the write-packet, the target is set to the memory controller 6b in accordance with the copy destination ID (main memory 4b) indicated in the config-register 20b. Therefore, the write-packet output from the second DMA engine 10b is transmitted to the memory controller 6b through the router 7b (Step S45). When receiving the write-packet, the memory controller 6b writes the read data to the main memory 4b in response to the DMA-Memory-Copy-Write command.

According to the present embodiment, the data link path which is used is only the data link path 14a as shown in FIG. 14. Therefore, the present embodiment has an excellent tolerance to failures of the data link paths.

Moreover, since the first DMA engine 10a generates the camouflage-packet, it is possible to carry out the data copy by simultaneously using both the first DMA engine 10a and the second DMA engine 10b. In the above example, the second DMA engine 10b plays a role of generating the write-packet corresponding to the completion-packet. As a result, load on the first DMA engine 10a is reduced. Therefore, the copy speed of the memory data is improved as a whole, and thus a total time required for the memory copy is reduced. That is, the suspended period of the system operation can be shortened.

Furthermore, since the first DMA engine 10a generates the camouflage-packet, the second DMA engine 10b needs not to issue any read-packet (read command). In other words, it is not necessary to transmit a read command from the second DMA engine 10b to the memory controller 6a via the IB link controller 11b, the data link path 13b, the OB link controller 12a and the router 7a. A transmission of a read command between the systems is omitted. As a result, the copy speed of the memory data is improved as a whole, and thus a total time required for the memory copy is reduced. Therefore, the suspended period of the system operation can be shortened.

Fifth Embodiment

The present invention is also useful when an error occurs on the data link paths 13, 14.

In a case when the data link path 13a fails, the second embodiment or the fourth embodiment can be applied. That is, when the CPU 3a detects an error of the data link path 13a, the CPU 3a makes the settings of the config-register 20 as in the second embodiment or the fourth embodiment. As shown in FIG. 8 or FIG. 14, the data link path 13a is not used in those embodiments. It is therefore possible to copy the memory data from the first main memory 4a to the second main memory 4b.

In a case when the data link path 14a fails, the third embodiment can be applied. That is, when the CPU 3a detects an error of the data link path 14a, the CPU 3a makes the settings of the config-register 20 as in the third embodiment. As shown in FIG. 11, the data link path 14a is not used in the third embodiment. It is therefore possible to copy the memory data from the first main memory 4a to the second main memory 4b.

In a case when the data link path 13b fails, the first, third and fourth embodiments can be applied. That is, when the CPU 3a detects an error of the data link path 13b, the CPU 3a makes the settings of the config-register 20 as in the first, third, or fourth embodiments. As shown in FIGS. 4, 11 and 14, the data link path 13b is not used in those embodiments. It is therefore possible to copy the memory data from the first main memory 4a to the second main memory 4b.

In a case when the data link path 14b fails, all the embodiments described above can be applied. That is, when the CPU 3a detects an error of the data link path 14b, the CPU 3a makes the settings of the config-register 20 as in any of the foregoing embodiments. It is thus possible to copy the memory data from the first main memory 4a to the second main memory 4b.

In a case when the data link paths 13a and 13b fail, namely, when all data link paths relevant to the In-Bound fail, the fourth embodiment can be applied. That is, when the CPU 3a detects errors of the data link paths 13a and 13b, the CPU 3a makes the settings of the config-register 20 as in the fourth embodiment. As shown in FIG. 14, the data link paths 13a and 13b are not used in the fourth embodiment. It is therefore possible to copy the memory data from the first main memory 4a to the second main memory 4b.

In a case when the data link paths 14a and 14b fail, namely, when all data link paths relevant to the Out-Bound fail, the third embodiment can be applied. That is, when the CPU 3a detects errors of the data link paths 14a and 14b, the CPU 3a makes the settings of the config-register 20 as in the third embodiment. As shown in FIG. 11, the data link paths 14a and 14b are not used in the third embodiment. It is therefore possible to copy the memory data from the first main memory 4a to the second main memory 4b.

In a case when the data link paths 13a and 14b fail, the second embodiment or the fourth embodiment can be applied. That is, when the CPU 3a detects errors of the data link paths 13a and 14b, the CPU 3a makes the settings of the config-register 20 as in the second embodiment or the fourth embodiment. As shown in FIG. 8 or FIG. 14, the data link paths 13a and 14b are not used in those embodiments. It is therefore possible to copy the memory data from the first main memory 4a to the second main memory 4b.

In a case when the data link path 14a and 13b fail, the third embodiment can be applied. That is, when the CPU 3a detects errors of the data link paths 14a and 13b, the CPU 3a makes the settings of the config-register 20 as in the third embodiment. As shown in FIG. 11, the data link paths 14a and 13b are not used in the third embodiment. It is therefore possible to copy the memory data from the first main memory 4a to the second main memory 4b.

As described above, according to the duplicate synchronization system 1, the DMA engine 10 and the method of operating the same of the present invention, the memory copy time is reduced. Therefore, the suspended period of the system operation is shortened. Moreover, it is possible to carry out the memory copy even when the DMA engine of one system fails. Furthermore, it is also possible to carry out the memory copy even when a part of the data link paths connecting between the both systems fails. It should be noted that the present invention can be also applied to a multiplex synchronization system constituted by three or more systems. Even in that case, the same effect can be obtained. Also, the router 7 may appropriately designate the target ID, instead of the DMA engine 10 generating the camouflage-packet.

It will be obvious to one skilled in the art that the present invention may be practiced in other embodiments that depart from the above-described specific details. The scope of the present invention, therefore, should be determined by the following claims.

What is claimed is:

1. A duplicate synchronization system comprising:
a first system; and
a second system configured to operate in synchronization with said first system,
wherein said first system and said second system are connected to each other through a plurality of data link paths,
said first system includes:
a first memory;
a first controller controlling a read/write for said first memory; and
a first DMA (Direct Memory Access) engine accessing said first controller,
said second system includes:
a second memory;
a second controller controlling a read/write for said second memory; and
a second DMA engine accessing said second controller,
wherein when sending a read command in which a source is indicated to any of said first controller and said second controller, each of said first DMA engine and said second DMA engine sets said source to any of said first DMA engine and said second DMA engine,
said first controller reads out a data from said first memory in response to said read command, and sends said read data back to said source, and
said second controller reads out a data from said second memory in response to said read command, and sends said read data back to said source.

2. The duplicate synchronization system according to claim 1,
wherein in a data copy from said first memory to said second memory, said first DMA engine sends to said first controller not only a first read command in which said source is set to said first DMA engine but also a second read command in which said source is set to said second DMA engine, said first controller reads out data from said first memory in response to respective of said first read command and said second read command, and sends said read data to respective of said first DMA engine and said second DMA engine, and said first DMA engine and said second DMA engine write said read data to said second memory through said second controller.

3. The duplicate synchronization system according to claim 2, wherein said first controller reads out data stored in a first address group in said first memory in response to said first read command, and reads out data stored in a second address group different from said first address group in said first memory in response to said second read command.

4. The duplicate synchronization system according to claim 3, wherein said first address group is one of an odd address group and an even address group, and said second address group is the other of said odd address group and said even address group.

5. The duplicate synchronization system according to claim 4, wherein at least any of said plurality of data link paths is failed.

6. The duplicate synchronization system according to claim 3, wherein at least any of said plurality of data link paths is failed.

7. The duplicate synchronization system according to claim 2, wherein at least any of said plurality of data link paths is failed.

8. The duplicate synchronization system according to claim 1, wherein in a data copy from said first memory to said second memory and in a case when said first DMA engine fails, said second DMA engine sends to said first controller said read command in which said source is set to said second DMA engine, said first controller reads out data from said first memory in response to said read command, and sends said read data to said second DMA engine, and said second DMA engine writes said read data to said second memory through said second controller.

9. The duplicate synchronization system according to claim 8, wherein at least any of said plurality of data link paths is failed.

10. The duplicate synchronization system according to claim 1, wherein in a data copy from said first memory to said second memory and in a case when said second DMA engine fails, said first DMA engine sends to said first controller said read command in which said source is set to said first DMA engine, said first controller reads out data from said first memory in response to said read command, and sends said read data to said first DMA engine, and said first DMA engine writes said read data to said second memory through said second controller.

11. The duplicate synchronization system according to claim 10, wherein at least any of said plurality of data link paths is failed.

12. The duplicate synchronization system according to claim 1, wherein in a data copy from said first memory to said second memory, said first DMA engine sends to said first controller said read command in which said source is set to said second DMA engine, said first controller reads out data from said first memory in response to said read command, and sends said read data to said second DMA engine, and said second DMA engine writes said read data to said second memory through said second controller.

13. The duplicate synchronization system according to claim 12, wherein at least any of said plurality of data link paths is failed.

14. A method of operating a duplicate synchronization system comprising:

(A) providing said duplicate synchronization system having:

a first system; and a second system operating in synchronization with said first system, wherein said first system includes a first memory and a first DMA engine accessing said first memory, and said second system includes a second memory and a second DMA engine accessing said second memory; and (B) using both of said first DMA engine and said second DMA engine in a data copy from said first memory and said second memory, wherein one of said first DMA engine and said second DMA engine is used for reading out data stored in an odd address group in said first memory, and the other of said first DMA engine and said second DMA engine is used for reading out data stored in an even address group in said first memory.

15. The method according to claim 14, wherein one of said first DMA engine and said second DMA engine which does not fail is used as said at least one DMA engine in said (B) step.

* * * * *